United States Patent [19]
Azuhata et al.

[11] 4,119,702
[45] Oct. 10, 1978

[54] PROCESS FOR ABATING CONCENTRATION OF NITROGEN OXIDES IN COMBUSTION FLUE GAS

[75] Inventors: Shigeru Azuhata; Hideo Kikuchi, both of Hitachi; Hidetoshi Akimoto, Tokaimura; Yukio Hishinuma; Yoshijiro Arikawa, both of Hitachi, all of Japan

[73] Assignee: Hitachi, Ltd., Japan

[21] Appl. No.: 817,745

[22] Filed: Jul. 21, 1977

[30] Foreign Application Priority Data

Jul. 28, 1976 [JP] Japan .................................. 51-89176

[51] Int. Cl.² ............................................. C01B 21/00
[52] U.S. Cl. ..................................... 423/235; 423/351
[58] Field of Search ......................... 423/235, 351, 400

[56] References Cited
U.S. PATENT DOCUMENTS

| 3,023,076 | 2/1962 | Karwat | 423/235 |
| 3,565,575 | 2/1971 | Warshaw | 423/235 |
| 3,733,393 | 5/1973 | Couillaud et al. | 423/235 |
| 3,801,696 | 4/1974 | Mark | 423/235 |
| 3,846,981 | 11/1974 | Paczkowski | 423/235 |
| 3,900,554 | 8/1975 | Lyon | 423/235 |
| 3,957,949 | 5/1976 | Senjo et al. | 423/235 |
| 3,961,018 | 6/1976 | Williamson | 423/235 |

FOREIGN PATENT DOCUMENTS

| 2,442,828 | 3/1975 | Fed. Rep. of Germany | 423/235 |
| 52-15,474 | 2/1977 | Japan | 423/235 |
| 186,985 | 3/1965 | U.S.S.R. | 423/235 |

Primary Examiner—O. R. Vertiz
Assistant Examiner—Eugene T. Wheelock
Attorney, Agent, or Firm—Craig & Antonelli

[57] ABSTRACT

Nitrogen oxides in a combustion flue gas are removed by reduction in a gaseous phase at a low temperature in the absence of any catalyst by adding urea and an oxidizing agent for decomposition of urea, such as ozone, nitric acid, hydrogen peroxide, chlorine, chlorine dioxide, or oxy acids of chlorine or their salts. $NO_x$ removal can be carried out in a very simplified manner with high percent $NO_x$ removal.

7 Claims, 1 Drawing Figure

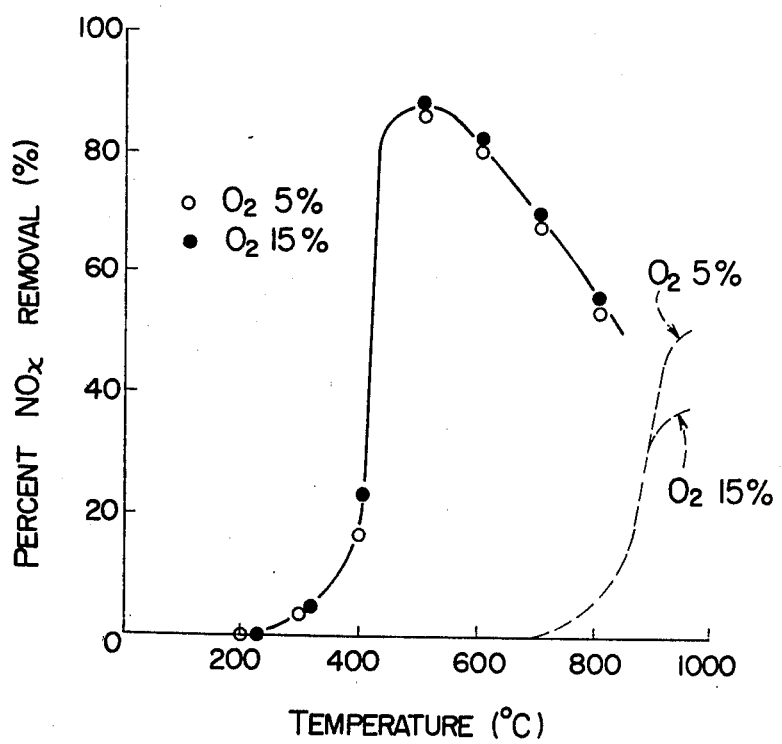

PROCESS FOR ABATING CONCENTRATION OF NITROGEN OXIDES IN COMBUSTION FLUE GAS

LIST OF PRIOR ART REFERENCES

The following references are cited to show the state of the art:
U.S. Pat. Nos. 3,900,554 and 3,846,981
U.S. Pat. application Ser. No. 702,990

This invention relates to a process for removing nitrogen oxides from combustion flue gas, and more particularly to a process for decomposing nitrogen oxides to water and nitrogen by reduction, using a reducing agent.

Nitrogen oxides contained in a flue gas evolving from combustion of fossil fuel are harmful substances to living beings. Since their effluent control was intensified, regarding them as a cause for photochemical smog, many processes have been proposed so far for removing the nitrogen oxides, which will be hereinafter referred to as $NO_x$. For example, an adsorption process, an alkali solution absorption process, and a reduction process are typical of them, but the reduction process is now the most dominating process on account of simplicity of its apparatus and operational procedure, as compared with the adsorption process and the absorption process.

The reduction process can be classified into two subgroups, i.e. non-selective reduction process using a reducing agent such as hydrocarbon, hydrogen, carbon monoxide, etc., and selective reduction process using ammonia, etc. The non-selective reduction process reduces a large amount of oxygen contained in the flue gas simultaneously with the reduction of $NO_x$, and thus consumption of the reducing agent is increased. On the other hand, the selective reduction process can reduce $NO_x$ in preference to the oxygen, and thus the consumption of the reducing agent is less than that in the non-selective reduction process, and therefore is economically excellent. Now, the selective reduction process is regarded as especially important among the reduction processes.

It is well known that ammonia and ammonium salts, and hydrazine, primary, secondary and tertiary amines can serve as the reducing agent for the selective reduction process (for example, U.S. Pat. Nos. 3,900,554 and 3,846,981), but it is also known that urea is also effective as the reducing agent beside the aforementioned agents (U.S. patent application Ser. No. 702,990.

However, application of said urea process to the reduction of $NO_x$ in the absence of catalyst has various problems due to high temperature conditions, since its applicable temperature in the presence of oxygen is in a very high temperature region such as 800° C. or higher, as in the ammonia process. For example, reaction of the reducing agent with oxygen is promoted at such an elevated temperature, and thus more than the equivalent amount of the reducing agent to $NO_x$ must be added to the flue gas to obtain a high percent $NO_x$ removal. There is also such a problem that the percent $NO_x$ removal is lowered with increasing oxygen concentration of the flue gas.

To solve these problems, use of catalysts has been so far proposed for lowering the reaction temperature. However, the catalytic reduction process using the catalyst requires additional techniques for prevention of catalyst-packed bed from clogging by dusts in the flue gas, etc., and thus is a somewhat complicated process, as compared with the direct reduction process using no catalyst.

An object of the present invention is to provide a process for directly reducing $NO_x$ in a flue gas in the absence of catalyst in a lower temperature region, using urea as a reducing agent.

As described above, amine compounds having groups —$NH_2$ are effective reducing agents for reducing $NO_x$, and the present inventors understand a reason for this as follows: $NH_2$ (amino radical) formed commonly from the amine compounds contributes to the reduction of $NO_x$. $NO_x$ can be reduced by reaction of the radical with $NO_x$ according to the following reaction formula:

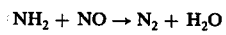

$$NH_2 + NO \rightarrow N_2 + H_2O$$

In other words, $NO_x$ can be readily reduced, so long as only $NH_2$ can be made available to the reaction.

The reduction processes so far studied and developed can be classified into two groups from a viewpoint of making the amine radical —$NH_2$, that is, a thermal decomposition process based on heating the reducing agent (ammonia or amine compounds) to decompose it, and a catalytic process based on contacting the reducing agent with a catalyst to decompose the former, but the present invention is essentially different from these two processes, since in the present invention the amine radical —$NH_2$ is formed by injecting the reducing agent together with an oxidizing agent into a flue gas to promote decomposition of the reducing agent by the oxidizing agent.

The present oxidation-decomposition process will be compared with said two processes, i.e. thermal decomposition process and catalytic process in view of effective temperature for the $NO_x$ removal in the so-called urea process.

In the thermal decomposition process where the reaction is carried out only by heating a reaction system comprising urea and NO, no effective reaction takes place for the $NO_x$ removal reaction unless the temperature is as high as at least 800° C. in the presence of oxygen. On the other hand, $NO_x$ can be reduced by urea even at a temperature of about 500° C., when a catalyst, for example, activated alumina, etc. is used. This is because the decomposition of the reducing agent can be promoted by the catalyst, and consequently heat required for the decomposition can be saved thereby. When the oxidizing agent, for example, perchloric acid, is used in the present oxidation-decomposition process, $NO_x$ can be reduced with a high percent $NO_x$ removal at such a temperature as 400° to 500° C., and consequently the heat required for the decomposition can be also saved, as in the case of the catalytic process.

Effective oxidizing agents for the present urea oxidation-decomposition process include ozone, nitric acid, hydrogen peroxide, chlorine, chlorine dioxide ($ClO_2$), and oxy acids of chlorine or their salts such as perchloric acid, sodium chlorate, sodium chlorite, sodium hydrochlorite, etc. In view of a possible secondary environmental pollution, it is preferable to use ozone and hydrogen peroxide as the oxidizing agent, though their suitable temperature ranges are a little higher than those for nitric acid and oxy acids of chlorine.

The amount of the oxidizing agent to be added to the flue gas can be such a minimum amount required for the decomposition of urea. That is, a molar ratio of the oxidizing agent to urea of about 0.1 to about 5 is satisfactory for the decomposition of urea.

Temperature range suitable for the $NO_x$ reduction is 200° to 800° C., though the most suitable one depends upon the oxidizing agent to be used, for example, 400° to 600° C. for nitric acid as the oxidizing agent, and 200° to 800° C. for chlorine, chlorine dioxide or the oxy acids of chlorine, 400° to 700° C. for $H_2O_2$.

Urea is added to the flue gas at a molar ratio of urea to $NO_x$ of about 0.5 — about 5 to 1. Oxygen concentration has no influence upon the effect of $NO_x$ removal.

Usually, urea is added to the flue gas in a form of aqueous solution by spraying, and the oxidizing agent can be added to the aqueous urea solution, or can be added directly to the flue gas with or without dilution by inert gas or air.

Especially the oxidizing agent chlorine and ozone are added directly to the flue gas after dilution by the inert gas or air.

The reducing agent urea and the oxidizing agent are added to the flue gas at said suitable temperature range, and the $NO_x$ removal reaction takes place instantaneously thereby. That is, it is not necessary to provide a prolonged duct or retention chamber for the $NO_x$ removal reaction.

Now, the present invention will be described in detail by way of Examples, referring to the accompanying drawing.

Single FIGURE shows relations between percent $NO_x$ removal and temperature, where a full line refers to a case using urea and perchloric acid, and a dotted line a case of using urea alone.

EXAMPLE 1

A reactor tube of quartz glass, 15 mm in diameter and 1 m long, was heated in an electric furnace. A gas mixture of NO, $O_2$ and $N_2$, concentration of each gas component being appropriately adjusted by the respective flow meter, and an $N_2$ gas containing urea and perchloric acid atomized by an atomizer were introduced into the heated reactor tube. $NO_x$ concentration of the gas mixture was measured by sampling small amounts of the gas mixture individually at the inlet and outlet of the reactor tube, and leading the sampled gas to an $NO_x$ concentration meter. Results obtained when the gas composition at the inlet of the reactor tube was set as shown in Table 1 are shown in FIGURE.

Table 1

| Components | Concentration |
|---|---|
| $CO(NH_2)_2$ | 50 ppm |
| $HClO_4$ | 50 ppm |
| NO | 50 ppm |
| $O_2$ | 5.15% |
| $N_2$ | balance |

Gas flow rate: 10 Nl/min

In FIGURE, the full line refers to the case of adding perchloric acid ($HClO_4$), and the dotted line the case of adding no perchloric acid in Table 1, that is, the case of NO reduction by urea alone.

In FIGURE, percent $NO_x$ removal was calculated according to the following formula:

$$\text{Percent } NO_x \text{ removal} = \left(1 - \frac{\text{NO concentration at outlet}}{\text{NO concentration at inlet}}\right) \times 100 \, (\%)$$

The effect of adding perchloric acid is apparent from FIGURE, where NO reduction can be conducted at a lower temperature with improved percent $NO_x$ removal than when no perchloric acid is added. Further, it is seen that the percent $NO_x$ removal is not changed by $O_2$ concentration.

EXAMPLE 2

$NO_x$ reduction was carried out in the same manner and under the same conditions as in Example 1, except that the temperature was set to 500° C. and the amount of perchloric acid was changed at an $O_2$ concentration of 5%. The results are shown in Table 2.

Table 2

| $HClO_4/CO(NH_2)_2$ | Percent $NO_x$ removal |
|---|---|
| 1 | 77% |
| 0.5 | 62% |
| 0.2 | 40% |
| 0.1 | 27% |

EXAMPLE 3

$NO_x$ reduction was carried out in the same manner and under the same conditions as in Example 1, except that nitric acid was used as the oxidizing agent in place of perchloric acid, and a molar ratio of nitric acid to urea was set to 1. The results are shown in Table 3.

Table 3

| | Percent $NO_x$ removal | |
|---|---|---|
| Temperature | $O_2$ 5% | $O_2$ 15% |
| 300° C | 0% | 0% |
| 400° C | 0.1% | 0.2% |
| 500° C | 17% | 25% |
| 600° C | 6% | 9% |
| 700° C | −22% | −12% |

EXAMPLE 4

$NO_x$ reduction was carried out in the same manner and under the same conditions as in Example 1, except that sodium chlorate was used as the oxidizing agent in place of perchloric acid, and a molar ratio of sodium chlorate to urea was set to 1. The results are shown in Table 4.

Table 4

| | Percent $NO_x$ removal | |
|---|---|---|
| Temperature | $O_2$ 5% | $O_2$ 15% |
| 200° C | 11% | 8% |
| 300° C | 35% | 13% |
| 400° C | 35% | 32% |
| 500° C | 53% | 55% |
| 600° C | 73% | 76% |
| 700° C | 52% | 57% |

EXAMPLE 5

$NO_x$ reduction was carried out in the same manner and under the same conditions as in Example 1, except that ozone and hydrogen peroxide were used individually as the oxidizing agent in place of perchloric acid, a molar ratio of the individual oxidizing agent was set to 1, and the $O_2$ concentration was set to 5%. The results are shown in Table 5.

Table 5

| | Percent $NO_x$ removal | |
|---|---|---|
| Temperature | $H_2O_2$ | $O_3$ |
| 400° C | 3% | 0% |
| 500° C | 7% | 10% |
| 600° C | 9% | 23% |
| 700° C | 15% | 30% |

In the present invention, $NO_x$ can be decomposed by reduction in a temperature range of 200° to 800° C. without using a catalyst, and thus process for $NO_x$ removal can be much simplified.

What is claimed is:

1. A process for abating concentration of nitrogen oxides in a combustion flue gas which comprises adding urea and an oxidizing agent for decomposition of urea, said oxidizing agent selected from the group consisting of ozone, nitric acid, hydrogen peroxide, chlorine, chlorine dioxide, perchloric acid, sodium chlorate, sodium chlorite, and sodium hypochlorite, to a combustion flue gas containing nitrogen oxides, thereby reducing the nitrogen oxides in a gaseous phase in the absence of a solid catalyst, the reduction of the nitrogen oxides taking place at a temperature in the range of 200° to 800° C.

2. A process according to claim 1, wherein the oxidizing agent is added to the flue gas at a molar ratio of the oxidizing agent to urea of 0.1 to 5.

3. A process according to claim 1, wherein the reduction nitrogen oxide is carried out at 400° to 600° C. with nitric acid as the oxidizing agent.

4. A process according to claim 1, wherein the nitrogen oxide reduction is carried out at 200° to 800° C. with chlorine, chlorine dioxide, perchloric acid, sodium chlorate, sodium chlorite or sodium hypochlorite as the oxidizing agent.

5. A process according to claim 1, wherein the nitrogen oxide reduction is carried out at 400° to 700° C. with hydrogen peroxide as the oxidizing agent.

6. A process according to claim 1, wherein the urea is added to the flue gas at a molar ratio of urea to $NO_x$ of 0.5 – 5 to 1.

7. A process according to claim 1, wherein the urea is added to the flue gas in a form of aqueous solution.

* * * * *